United States Patent
Bastias Ibarra

(10) Patent No.: US 10,813,298 B2
(45) Date of Patent: Oct. 27, 2020

(54) TWO-COLOR NET FOR PROTECTING FRUIT AGAINST DAMAGE CAUSED BY DIRECT SOLAR RADIATION AND HIGH TEMPERATURES

(71) Applicant: UNIVERSIDAD DE CONCEPCION, Concepcion (CL)

(72) Inventor: Richard Mauricio Bastias Ibarra, Concepcion (CL)

(73) Assignee: UNIVERSIDAD DE CONCEPCION, Concepcion (CL)

( * ) Notice: Subject to any disclaimer, the term of this patent is extended or adjusted under 35 U.S.C. 154(b) by 89 days.

(21) Appl. No.: 16/312,631

(22) PCT Filed: Jun. 12, 2017

(86) PCT No.: PCT/CL2017/050025
§ 371 (c)(1),
(2) Date: Jan. 25, 2019

(87) PCT Pub. No.: WO2017/219160
PCT Pub. Date: Dec. 28, 2017

(65) Prior Publication Data
US 2019/0166772 A1  Jun. 6, 2019

(30) Foreign Application Priority Data

Jun. 24, 2016 (CL) .................................. 01634-16

(51) Int. Cl.
A01G 13/02     (2006.01)
D04B 21/00     (2006.01)
(Continued)

(52) U.S. Cl.
CPC ......... *A01G 13/0268* (2013.01); *A01G 7/045* (2013.01); *D01F 1/106* (2013.01);
(Continued)

(58) Field of Classification Search
CPC ....... A01G 13/0268; A01G 7/04; A01G 7/045
(Continued)

(56) References Cited

U.S. PATENT DOCUMENTS 3,043,709 A * 7/1962 Amborski .............. C08K 5/132
                                                    428/216
4,761,913 A * 8/1988 Henningsson ....... A01G 9/1438
                                                     47/17
(Continued)

FOREIGN PATENT DOCUMENTS

CL              6917 A        7/2004
CL         2015000604         3/2015
(Continued)

OTHER PUBLICATIONS

Catalina Umanzor, et al., "Influencias Del Uso De Malla Perla Y Roja En Las Condiciones Micro-Climaticas, Dano Por Sol Y Desarrollo De Color De Frutos En Huertos De Manzanos CVS. Gala Y Fuji", vol. 39, No. 1, pp. 1-13; Jul. 20, 2015.
(Continued)

*Primary Examiner* — Magdalena Topolski
*Assistant Examiner* — Shada Mohamed Alghailani
(74) *Attorney, Agent, or Firm* — Lucas & Mercanti, LLP

(57) ABSTRACT

Two-color net for protecting fruit against damage caused by direct solar radiation and high temperatures, used in combination and/or separately, which is made with two monofilaments that are blue and grey in color with a thickness of 0.26-0.32 mm.

2 Claims, 3 Drawing Sheets

(51) Int. Cl.
  *D01F 8/04* (2006.01)
  *A01G 7/04* (2006.01)
  *D01F 1/10* (2006.01)
  *D03D 1/00* (2006.01)

(52) U.S. Cl.
  CPC .............. *D01F 8/04* (2013.01); *D03D 1/007* (2013.01); *D04B 21/00* (2013.01); *D10B 2401/22* (2013.01)

(58) Field of Classification Search
  USPC ........................................ 47/58.1 LS, DIG. 6
  See application file for complete search history.

(56) References Cited

U.S. PATENT DOCUMENTS

| | | | | | |
|---|---|---|---|---|---|
| 5,771,630 | A | * | 6/1998 | Harasawa | A01G 9/1438 47/29.4 |
| 6,441,059 | B1 | * | 8/2002 | Kieser | A01G 9/1438 523/135 |
| 7,762,019 | B2 | * | 7/2010 | Van Rensburg | A01G 9/1438 47/29.1 |
| 9,414,549 | B2 | * | 8/2016 | Toye | A01G 13/0206 |
| 2002/0028620 | A1 | * | 3/2002 | Guberman | D04B 21/12 442/41 |
| 2009/0291251 | A1 | | 11/2009 | Suzuki et al. | |
| 2011/0197508 | A1 | | 8/2011 | Swennen et al. | |
| 2013/0239472 | A1 | * | 9/2013 | Toye | B32B 27/12 47/31 |
| 2014/0173981 | A1 | * | 6/2014 | Ichikawa | A01G 9/1438 47/58.1 R |
| 2015/0223411 | A1 | * | 8/2015 | Toye | D03D 1/007 442/49 |
| 2016/0174473 | A1 | * | 6/2016 | Toye | A01G 13/0268 47/20.1 |
| 2016/0174474 | A1 | * | 6/2016 | Toye | A01G 13/0268 47/20.1 |
| 2016/0353677 | A1 | * | 12/2016 | Toye | D04B 21/12 |

FOREIGN PATENT DOCUMENTS

| | | |
|---|---|---|
| ES | 2534178 T3 | 3/2015 |
| WO | 2006073177 A1 | 7/2006 |
| WO | 2012072905 A1 | 6/2012 |
| WO | 2014041499 A1 | 3/2014 |
| WO | 2014175308 A1 | 10/2014 |
| WO | 2015122783 A1 | 8/2015 |

OTHER PUBLICATIONS

María Catalina Umanzor, "Influencias Del Uso De Malla Perla Y Roja En Las Condicione Micro-Climaticas, Dano Por Sol Y Desarrollo De Color De Frutos En Huertos De Manzanos CVS. Gala Y Fuji", Tesis, pp. 1-28, Chillan-Chile, 2015.

Richard Bastias, "Malla Sombra En Manzanos" Boletin Tecnico Pomaceas; Universidad De Talca; Chile; vol. 16 No. 2, pp. 1-8, Mar. 2016.

Mario Marcelo Rodriguez Beraud, et al., "Efecto De Mallas Sombreadoras Sobre La Produccion Y Calidad De Frutos De Arandano" . . . ; Scientia Agropecuaria vol. 6, No. 1, pp. 41-50, 2015.

Office Action for corresponding Chile Application No. 201601634, dated Jun. 24, 2016.

Office Action for corresponding Chile Application No. 201601634, dated Apr. 5, 2018.

Registration Acceptance Resolution for corresponding Chile Application No. 201601634, dated Mar. 4, 2019.

Bastias et al., "Exploring the Potential Use of Photo-Selective Nets for Fruit Growth Regulation in Apple", Chilean Journal of Agricultural Research, 2012 vol. 72, No. 2, pp. 224-231.

Bastias et al., "Light Quality Management in Fruit Orchards: Physiological and Technological Aspects", Chilean Journal of Agricultural Research, 2012, vol. 72, No. 4, pp. 574-581.

International Search Report for Corresponding International Application No. PCT/CL2017/050025 (3 Pages) (dated Sep. 21, 2017).

Supplementary Report on Patent Application corresponding to Chile Application No. 201601634, dated Jul. 11, 2018.

* cited by examiner

TWO-COLOR NET FOR PROTECTING FRUIT AGAINST DAMAGE CAUSED BY DIRECT SOLAR RADIATION AND HIGH TEMPERATURES

CROSS REFERENCE TO RELATED APPLICATION

This Application is a 371 of PCT/CL2017/050025 filed on Jun. 12, 2017, which claims priority of Chilean Application No. 01634-16 filed Jun. 24, 2016, both of which are incorporated herein by reference.

TECHNICAL SECTOR

The present invention can be applied in the field of agriculture, specifically in fruit growing, to prevent damage to fruit caused by direct solar radiation and high temperatures.

PRIOR ART

At the present time, sun damage to fruit due to an excess of solar radiation and high temperatures results in significant economic losses for the fruit industry. The apple industry is most affected by this damage, which in countries like the United States, South Africa, Australia, Spain and Chile causes annual losses of more than 100 million dollars from fruit that cannot be sold (Racsko & Schrader, 2012).

In addition to pre-harvesting losses, sun damage leads to a lowering of fruit quality after harvesting by provoking other physiological disorders such as scalding and russeting, as well as pathogen attacks that cause the fruit to rot in storage (Racsko & Schrader, 2012).

The current climate-change situation that appears to be raising solar radiation levels and temperatures makes it highly probable that the incidence and severity of sun damage to fruit will become an increasingly complex problem for producers in the coming years (Racsko & Schrader, 2012).

Sun damage symptoms in fruit include skin discoloration, resulting from the degradation of red pigments (anthocyanins) and green pigments (chlorophylls) as a reaction to solar radiation excess and high temperatures, thus affecting the commercial quality of both green and red apples. There are three types of sun damage, varying according to the cause: i) damage occasioned only by high temperatures, ii) damage occasioned by the combined effect of solar radiation together with high temperatures, and iii) damage occasioned only by excessive solar radiation. The complex interaction of these environmental variables has made it difficult to develop techniques to control this problem effectively in field conditions (Schrader et al., 2001; Felicetti & Schrader, 2008).

Technologies already exist to combat sun damage to fruit. However, none of these technologies has proved to be completely effective in the control of this form of damage in orchards, and their application has disadvantages that will be described in the next section:

a.—Evaporative cooling using irrigation water: The aim of this technique is to produce fruit cooling through the application of irrigation water at times of greatest heat. Although this technique has been shown to reduce sun damage to fruit caused by high temperatures, it has not been effective in the control of damage from excessive solar radiation, so that some of the fruit in the orchard has suffered damage all the same (Schrader et al., 2001; Felicetti & Schrader, 2008). The disadvantage of this practice is that it involves high energy and water costs. In addition, it requires high-quality irrigation water similar to drinking water; otherwise mineral salts such as magnesium, calcium and others accumulate in the fruit and are difficult to remove, so that the fruit no longer conforms to the safety levels demanded by the market (Yuri et al., 2000).

b.—Chemical agents and solar protectors: the application of antioxidant compounds has been proposed as a means of controlling sun damage. The most commonly used compounds have been ascorbic acid and α-tocopherol (vitamin E), but with unsatisfactory results when evaluated in relation to different varieties of apples in countries such as the United States and Chile. The main disadvantage with this type of product is that it only reduces photooxidative damage caused by excessive radiation and has little effect on damage produced by excessive heat (Andrews et al., 1999; Yuri et al., 2000).

Another possibility is the use of white kaolins, such as aluminum silicate, calcium carbonate or magnesium silicate, whose function is to reflect solar radiation and block its effect on fruit. There are a number of these products on the market; for example, SURROUND®, ECLYPSE™, COCOON™ (Glenn & Puterka, 2005; Hanrahan et al., 2009). Although the effectiveness of kaolins has been demonstrated in the control of sun damage, their use in Chile has not reduced this damage by more than 15% in highly susceptible varieties of apples. This technique also requires constant applications during the season to prevent their removal by wind and rain, increasing costs. Another disadvantage is the air pollution that can result from the emission of particles, in addition to the need for fruit to be thoroughly washed to remove the kaolin prior to packing (Yuri et al., 2004).

In the last few years a product has been developed based on carnauba waxes, the commercial name of which is RAYNOX®. The advantage of this product in relation to kaolins is that it is a transparent film, so that the fruit does not need to be washed before packing. It has been reported that this product is effective in controlling sun damage to apples in countries such as the United States (Schrader, 2011). However, in the extreme climatic conditions existing in Chile its effectiveness is lower than that of kaolins (Yuri, 2013).

c.—Fruit bagging: Covering fruit in paper bags has been shown to be effective in reducing sun damage caused by excessive solar radiation. In addition, when the bags are removed before harvesting, the fruit has a better color, giving it higher commercial value. Nevertheless, the disadvantage of this technique is that it is labor intensive in terms of placing and removing the bags, which makes it economically unviable. Furthermore, in hot summers a significant percentage of the fruit is damaged by the high temperatures inside the bags (Gao et al., 2002).

d.—Shade cloth: To date, shade cloth has basically been used to control sun damage and in Chile it has been effective to a certain extent. However, even with this type of covering about 15% of the fruit still shows severe sun damage, and its effectiveness is lower than that of evaporative cooling (Yuri, 2013). In Argentina, 15% and 55% shade cloth has been tested. The former is not effective in controlling sun damage, while the latter is effective, but the quality of the fruit is lower due to the excessive shade, so that its commercial application appears to be economically unviable (Dussi et al., 2005). Finally, in Brazil 18% shade cloth has been ineffective in reducing sun damage in vulnerable apple varieties in that 20% of the fruit under this cover is still damaged (Amarante et al., 2011).

All of the above information reveals the need for the development of new techniques to reduce the effects of solar radiation on fruit.

DIVULGATION OF THE INVENTION

Figure 1:
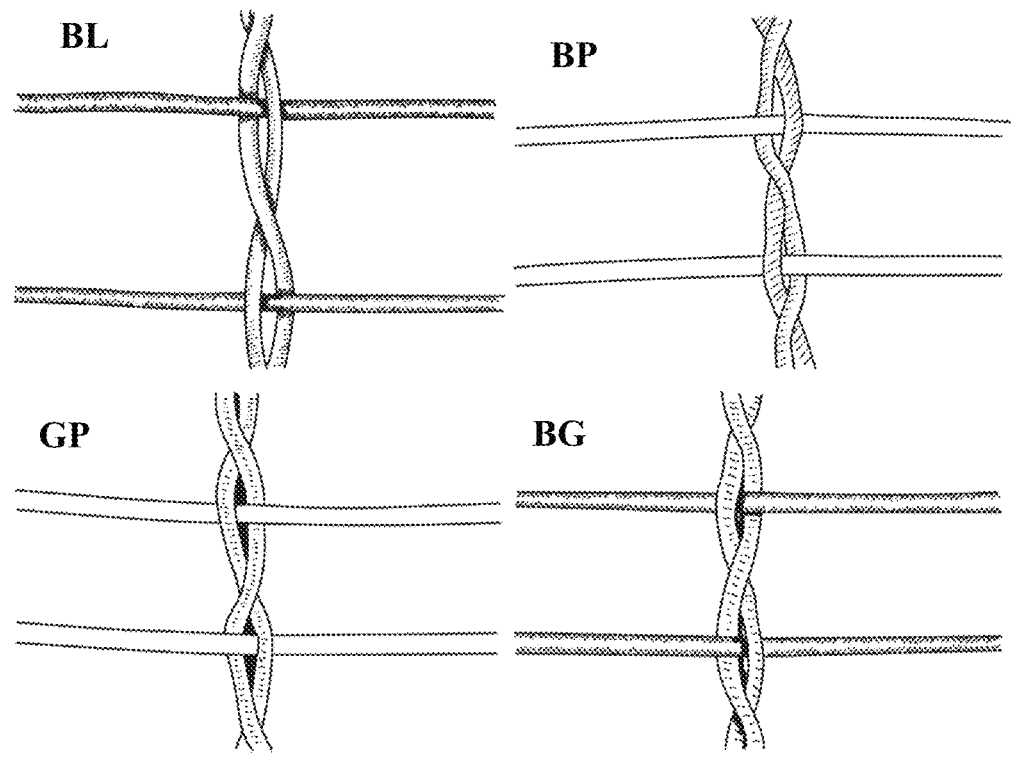
FIG. 1: An image of two-colored net where (BL) is the control, (BP) is the blue-pearl colored weave, (GP) is the grey-pearl colored weave, and (BG) is the blue-grey weave.

This technology corresponds to two-colored net for protecting fruit against damage caused by direct solar radiation and high temperatures, in combination with or separate from other techniques. Specifically, this net controls sun damage to species of pome fruit such as apples and pears, which does not mean that it cannot be applied to other fruit species sensitive to sun damage such as grapes, kiwis and pomegranates, as well as fruit vegetables such as tomatoes and peppers, among others.

The two-colored net has a specific configuration in terms of the thickness, distance and proportion of the colors of the monofilaments (threads). This configuration, shown in Table 1, has unique optical properties in relation to the transmission of solar radiation. In this way, the combination of pearl-colored, blue and grey monofilaments ensure the following light conditions and has the following advantages in orchards:

i. An increase in the proportion of diffuse light in the order of 15%-20% and a reduction in the proportion of direct light in the order of 5%-10%, which leads to less stress from solar radiation and greater utilization of light to develop the color of the fruit and other positive production aspects such as increased floral development, fruiting and fruit growth;

ii. an increase in the relation between the amount of light transmitted in the blue spectrum (400-500 nm) as opposed to light transmitted in the red spectrum (600-700 nm) in the order of 1.1-1.5, which provides a greater synthesis of chlorophylls and the development of green color in fruit, preventing the degradation of green color caused by excessive radiation; and iii. a reduction in the proportion of light transmission in the infrared spectrum (700-1500 nm) in the order of 5%-10%, reducing fruit surface temperature and thereby preventing damage caused by excessive heat stress.

These optical properties relating to solar radiation transmission give the net more effective fruit damage control and improve the color of green and red fruit varieties. This net must be installed in orchards with 70%-80% light transmission; that is, with a shade capacity of 20%-30%, which will depend on the species and locality in need of protection. The installation of this net with this percentage of shade ensures, depending on the species and locality, effective control of sun damage and improves the color of the fruit, without negatively affecting production aspects such as caliber, yield or floral returns that may suffer if there is excessive shade in the orchard.

TABLE 1

Design configuration and optical properties of the two-colored net

| Configurations | Specific quantitative value |
|---|---|
| Monofilament thickness (mm) | 0.26 to 0.32 |
| Weft density (monofilaments/cm) | 2.6 to 4.2 |
| Warp density (monofilaments/cm) | 2.6 to 4.2 |
| Thread color proportion A:B | 50:50 |
| Total light transmission (%) | 70 to 80 |
| Diffuse light transmission (%) | 15 to 20* |
| Direct light reduction (%) | 5 to 10* |
| Transmission of blue light vs. red light (relation) | 1.1 to 1.5 |
| Reduction of light in the infrared spectrum (%) | 5 to 10* |

*Estimated value in relation to net in a neutral material with a similar shade % (black).

The two-colored net can include the following specific thread colors for specific purposes:

Pearl: to transform direct light into diffuse light, thereby reducing the so degradation of anthocyanins in red varieties caused by excessive direct solar radiation;

blue: to increase the proportion of light in the blue spectrum, thereby stimulating the synthesis of chlorophylls in green varieties and preventing their degradation caused by excessive direct solar radiation; and grey: to reduce the transmission of light in the infrared spectrum, thereby lowering the air temperature and thus preventing sun damage associated with this factor in both green and red varieties.

The manufacture of the two-colored net includes the following stages:

a. The obtaining of monofilaments through an extrusion process, which involves the fusion of a polymer, preferably high-density polyethylene but not excluding the use of other less dense polyethylenes, with pigments and additives. The pigments are incorporated using a polymer coloring system (masterbatch) with the colors blue, grey and pearl, which are mixed with the polyethylene in a proportion of 2%-5% w/w, according to the type of pigment. With regard to the additives, an anti-UV is used in the form of masterbatch, which corresponds to a mixture of HALS polymer additives in a proportion equal to or greater than 0.6% w/w, in relation to the polymer.

b. The weaving of the grey, blue and pearl-colored monofilaments using flat looms with an English twist weave to produce the specific thread combination with the flat weave, respecting the color proportions indicated in Table 1.

It is highly advantageous that this two-colored net makes it possible to obtain certain optical properties in relation to the selective transmission of solar radiation, resulting in a combined effect involving an increase in the proportion of diffuse radiation, a reduction in direct and thermal (infrared) radiation, and an increase in the proportion of radiation in the blue light spectrum. This combined effect leads to more efficient control of sun damage and better fruit coloring, both in green and red varieties.

Application Example

In order to verify the effect of the two-colored net on the fruit, three prototypes of two-colored monofilament net made out of high-density polyethylene (HDPE) were produced, the technical specifications of which are presented in Table 2.

TABLE 2

Technical specifications of two-colored net prototypes

| Prototype | Density (monofilaments/cm) | | Color combination | |
|---|---|---|---|---|
| | Weft | Warp | Weft | Warp |
| Blue-pearl | 4 | 4 | Pearl | Blue |
| Grey-pearl | 4 | 4 | Pearl | Grey |
| Blue-grey | 4 | 4 | Grey | Blue |

First, trials were carried out in commercial orchards producing Granny Smith green apples and Pink Lady® red apples. In each orchard a surface area of 2,500 m² was covered with each type of two-colored net, accompanied by a control of the same surface area covered with the black net traditionally used by producers. All types of two-colored shade cloth were made with a thread weave similar to that of the black net, adjusting the distance between the threads so as to produce the same shade percentage, which was in the order of 20%, as shown in FIG. 1, where (BL) is the control, (BP) is the blue-pearl colored weave, (GP) is the grey-pearl colored weave, and (BG) is the blue-grey weave.

In total four rows of trees were covered by each type of net. The two center rows were divided into 4 randomly-selected plots (repeats), from which three trees per plot were marked (a total of 12 trees) for the respective evaluations.

Before the net was installed, verification of light properties was conducted in samples of material 2×2 m in size, by quantifying light absorption (%) with a quantum sensor model LI-190 (LI-COR, Lincoln, USA), and radiation transmission in the blue light spectrum (400-500 nm) and the infrared light spectrum (700-1350 nm) with a spectroradiometer model Field-Spec (ASD Inc., Colorado, USA)."

Subsequently, and in field conditions, the daily variation in direct photosynthetic active radiation conditions (direct PAR) and diffuse photosynthetic active radiation conditions (diffuse PAR) were measured periodically using a quantum sensor model LI-190 (LI-COR, Lincoln, USA) according to the protocol proposed by Retamal-Salgado et al., (2015). Simultaneously, the surface temperature of the fruit was quantified using an infrared thermometer model IRT600 (EXTECH INSTRUMENTS, Nashua, USA).

Figure 2:
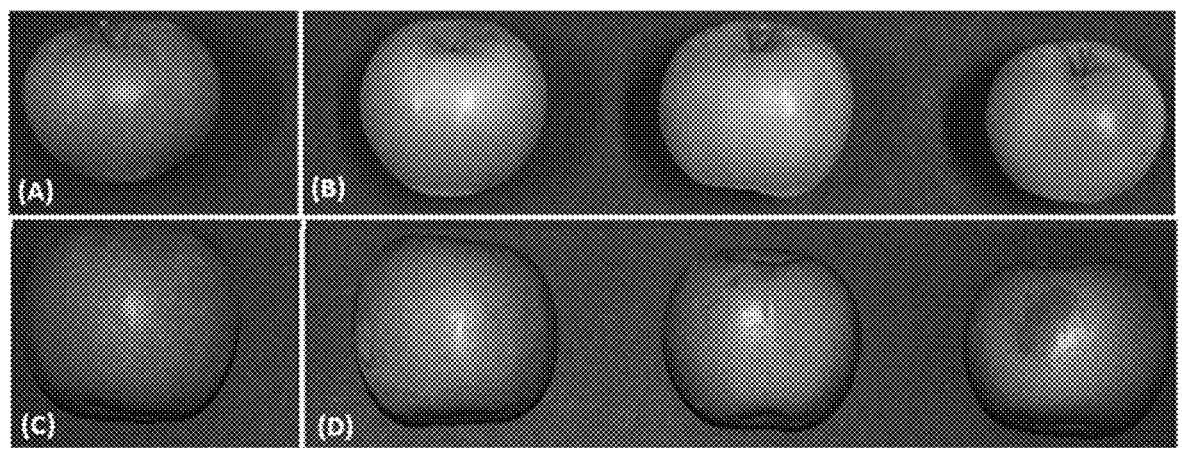
FIG. 2: Images of apples without sun damage where (A) is the green variety Granny Smith and (C) is the red variety Pink Lady®; and images with sun damage where (B) is the green variety Granny Smith and (D) is the red variety Pink Lady®.

The total amount of fruit from each tree was harvested and then categorized: with and without sun damage, and in accordance with a visual symptom scale measuring the damage suffered by each variety. FIG. 2 presents the apples without sun damage, where (A) is the green variety Granny Smith and (C) is the red variety Pink Lady®; in addition, it presents 3 samples of sun damaged apples, where (B) is the green variety Granny Smith and (D) is the red variety Pink Lady®. 100% of the Granny Smith apples were harvested in one picking, while the Pink Lady® harvest was completed in two pickings.

Figure 3:
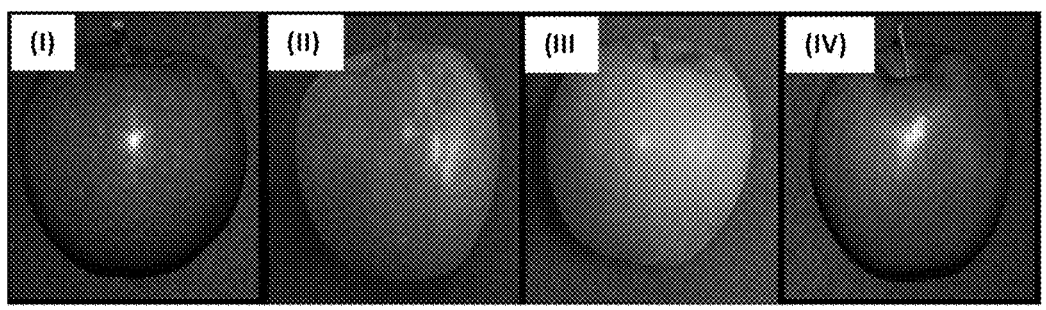
FIG. 3: Images of Granny Smith apples after sun damage evaluation, categorized according to color: intense green color (I), pale green (II), yellow (III) and with a red blush (IV).
Figure 4:
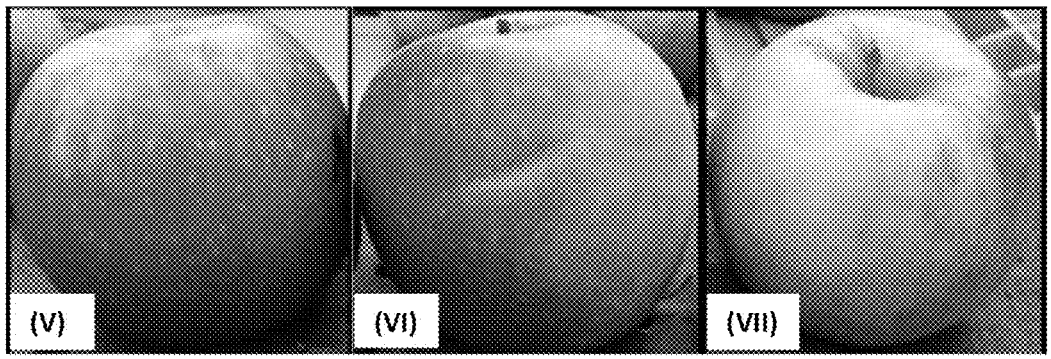
FIG. 4: Images of Pink Lady® apples after sun damage evaluation, categorized according to the percentage of red color covering: more than 75% (V), 50%-75% (VI) and less than 50% (VII).

After the sun damage evaluation, the fruit was classified according to color using specific scales for each variety (FIG. 3). In the case of Granny Smith, apples were placed into the categories of intense green color (I), pale green (II), yellow (III) and with a red blush (IV). In the case of Pink Lady®, the apples were put into three categories according to the percentage of red covering: more than 75% (V), 50%-75% (VI) and less than 50% (VII), as shown in FIG. 4.

The light absorption (shade %) of the different types of net was in all cases about 20%, similar to that of black net. The GP and BG net reduced the transmission of light in the infra-red spectrum by almost 7%. The BP and the BG net increased the proportion of blue light by 2.3% and 1.7%, respectively in relation to black net (Table 3).

TABLE 3

Light properties measured in material samples of blue-pearl (BP), grey-pearl (GP) and blue-grey (BG) net in comparison with traditional black net (BL).

| Shade cloth type | Light absorption (%) | Increase in proportion of blue light in relation to black net (%) | Reduction of light in the infrared spectrum in relation to black net (%) |
|---|---|---|---|
| BP | 20.4 ± 1.6 | 2.3 | −1.0 |
| GP | 19.5 ± 0.6 | 0 | 7.1 |
| BG | 23.0 ± 1.0 | 1.7 | 7.3 |
| BL | 20.9 ± 0.5 | — | — |

Figure 5:
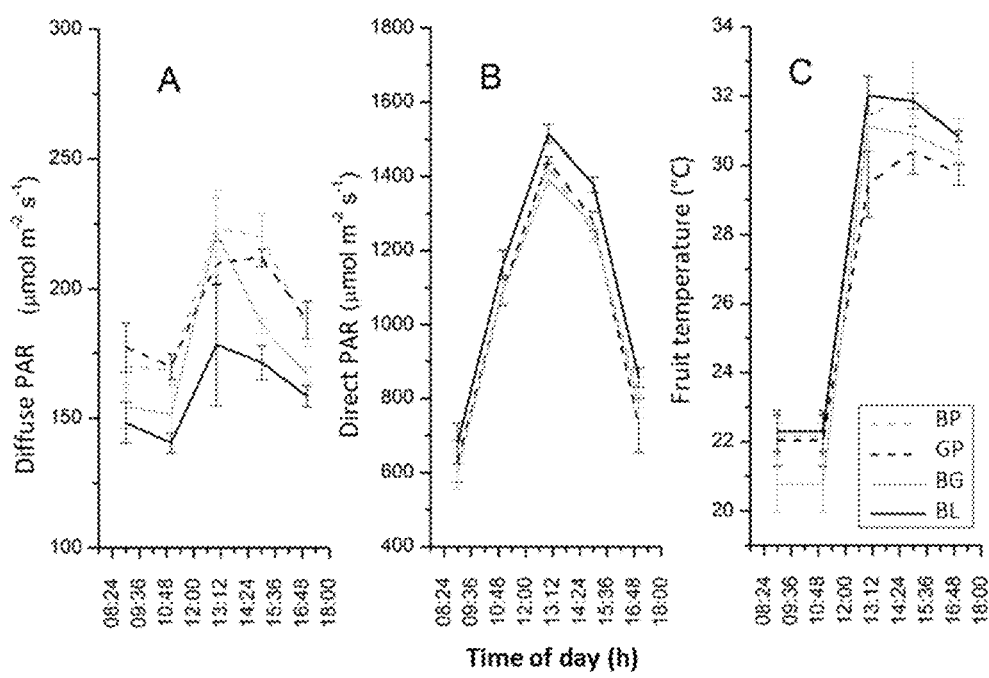
FIG. 5: A graphic of the variation in the pattern of diffuse solar radiation (A), direct solar radiation (B) and fruit temperature (C) under two-colored blue-pearl net (BP), grey-pearl net (GP) and blue-grey net (BG) in comparison with traditional black net (BL).

FIG. 5 presents the variation in the pattern of diffuse solar radiation (A), direct solar radiation (B) and fruit temperatures (C) under two-colored blue-pearl (BP), grey-pearl (GP) and blue-grey (BG) net in comparison with traditional black net (BL). In field conditions the two-colored shade cloth increased diffuse radiation transmission by 17% and reduced direct radiation transmission by 8% (A and B). Fruit surface temperature under BG and GP colored net was on an average 1°-2° C. lower in relation to black net (C).

With regard to the Granny Smith green variety, the two-colored blue-grey net significantly reduced the amount of fruit with sun damage, namely by 10%, and increased by 11% the amount of fruit harvested with an intense green color (Table 4).

TABLE 4

Sun damage and fruit color under two-colored net in comparison with traditional black net. Granny Smith variety in the locality of Teno, Maule Region, Chile.

| Type of net | Sun damaged fruit (%) | Quantity of fruit in color categories (%) | | | |
|---|---|---|---|---|---|
| | | Intense green | Pale green | Yellow | Red blush |
| Blue-pearl (BP) | 25.3 | 35.0 | 39.5 | 25.3 | 0.1 |
| Grey-pearl (GP) | 24.6 | 46.3 | 28.5 | 24.6 | 0.4 |
| Blue-grey (BG) | 14.4 | 69.1 | 16.2 | 14.4 | 0.1 |
| Black (BL) | 24.4 | 58.5 | 16.2 | 24.4 | 0.8 |
| Significance | * | * | * | * | NS |

* NS: significant and not significant for $P < 0.05$, respectively.

With regard to the Pink Lady® red variety, the three types of two-colored net reduced the amount of sun damaged fruit in comparison with black net by 7% in the first picking and by 3% in the total harvest, this effect being significant with grey-pearl colored net. In terms of color, the two-colored GP and BG net significantly increased, namely by 18%, the amount of fruit with a higher percentage of red color covering (>75%) for the first picking and by 16% in the total harvest, as shown in Tables 5 and 6, respectively.

TABLE 5

Sun damage and fruit color under two-colored net in comparison with traditional black net. Pink Lady ® variety in the locality of Molina, Maule Region, Chile, (first picking).

| Type of net | Sun damaged fruit (%) | Quantity of fruit in color categories (%) | | |
|---|---|---|---|---|
| | | >75% | 50-75% | <50% |
| BP | 6.3 | 16.3 | 74.6 | 9.0 |
| GP | 3.6 | 45.9 | 47.9 | 6.0 |
| BG | 4.1 | 45.6 | 51.1 | 3.2 |
| BL | 11.9 | 28.2 | 71.2 | 0.6 |
| Significance | * | * | * | * |

* NS: significant and not significant for P < 0.05, respectively.

TABLE 6

Sun damage and fruit color under two-colored net in comparison with traditional black net. Pink Lady ® variety in the locality of Molina, Maule Region, Chile, (total harvest).

| Type of net | Sun damaged fruit (%) | Quantity of fruit in color categories (%) | | |
|---|---|---|---|---|
| | | >75% | 50-75% | <50% |
| BP | 1.6 | 17.7 | 56.9 | 25.2 |
| GP | 1.5 | 37.9 | 47.8 | 14.2 |
| BG | 1.7 | 37.4 | 46 | 16.6 |
| BL | 4.0 | 21.7 | 57.5 | 20.7 |
| Significance | * | * | NS | NS |

* NS: significant and not significant for P < 0.05, respectively.

The two-colored net types produced less stressful solar radiation and temperature conditions in comparison to traditional black net, so that they were more effective in controlling sun damage and color development in the fruit.

According to the results, the BG and GP two-colored net types are the best with regard to effectiveness in the control of sun damage to the fruit and an increase in its color. For green varieties such as Granny Smith the best alternative was BG net, while for red varieties such as Pink Lady® the best alternative was GP net, although BG net could also be used for these varieties because of its positive effect on the color of the fruit.

The invention claimed is:

1. A net for protecting fruit against damage caused by direct solar radiation and high temperatures, comprising two monofilaments in the colors blue and grey in a 50:50 ratio; a thickness of 0.26-0.32 mm; a weft density of 2.6-4.2 monofilaments/cm; a warp density 2.6-4.2 monofilaments/cm; total light transmission of 70-80%; diffuse light transmission of 15-20%; direct light reduction of 5-10%; a blue versus red light transmission ratio of 1.1-1.5; and a reduction of light in the infrared spectrum of 5-10%.

2. A process to make the net according to claim 1, comprising: (a) obtaining the monofilaments by extrusion, which involves the fusion of high-density polyethylene with pigments in a proportion of 2%-5% w/w in relation to a polymer and an anti-UV additive in a proportion equal to or greater than 0.6% w/w in relation to the polymer; and (b) weaving the monofilaments using flat looms with an English twist weave, thereby obtaining the net comprising two monofilaments in the colors blue and grey in a 50:50 ratio; a thickness of 0.26-0.32 mm; a weft density of 2.6-4.2 monofilaments/cm; a warp density 2.6-4.2 monofilaments/cm; total light transmission of 70-80%; diffuse light transmission of 15-20%; direct light reduction of 5-10%; a blue versus red light transmission ratio of 1.1-1.5; and a reduction of light in the infrared spectrum of 5-10%.

* * * * *